(12) United States Patent
Akiyama et al.

(10) Patent No.: US 7,889,055 B2
(45) Date of Patent: Feb. 15, 2011

(54) IC TAG, IC TAG SYSTEM, AND METHOD OF EXECUTING COMMAND OF THE IC TAG

(75) Inventors: Kazuhiro Akiyama, Kanagawa (JP); Hatsuhide Igarashi, Kanagawa (JP); Seiichi Okamoto, Kanagawa (JP); Toshiyuki Miyashita, Kanagawa (JP); Kazumi Seki, Kanagawa (JP); Tatsuya Uchino, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 310 days.

(21) Appl. No.: 11/526,627

(22) Filed: Sep. 26, 2006

(65) Prior Publication Data

US 2007/0069860 A1 Mar. 29, 2007

(30) Foreign Application Priority Data

Sep. 27, 2005 (JP) .............................. 2005-280982

(51) Int. Cl.
*H04Q 5/22* (2006.01)
*G06F 11/30* (2006.01)
*G06F 12/14* (2006.01)

(52) U.S. Cl. .................. 340/10.1; 713/190; 340/825.52; 340/10.5

(58) Field of Classification Search .................... 340/51, 340/824.54, 10.1, 10.5, 825.52
See application file for complete search history.

(56) References Cited

U.S. PATENT DOCUMENTS

| | | | | |
|---|---|---|---|---|
| 3,735,353 | A | * | 5/1973 | Donovan et al. ........ 340/825.37 |
| 5,430,447 | A | * | 7/1995 | Meier ....................... 340/10.51 |
| 5,532,686 | A | * | 7/1996 | Urbas et al. .............. 340/10.51 |
| 5,933,090 | A | * | 8/1999 | Christenson ........... 340/825.69 |
| 6,201,731 | B1 | * | 3/2001 | Kamp et al. ........... 365/185.02 |
| 6,288,629 | B1 | * | 9/2001 | Cofino et al. ............... 340/10.1 |
| 6,747,546 | B1 | * | 6/2004 | Hikita et al. ............. 340/10.31 |
| 2003/0137403 | A1 | * | 7/2003 | Carrender et al. .......... 340/10.4 |
| 2005/0149450 | A1 | * | 7/2005 | Stefik et al. .................... 705/58 |
| 2006/0007771 | A1 | * | 1/2006 | Sato ........................... 365/226 |
| 2008/0114228 | A1 | * | 5/2008 | McCluskey et al. ......... 600/365 |

OTHER PUBLICATIONS

Blaze, "Minimal Key Lengths for Symmetric Ciphers to Provide Adequate Commericial Security, A Report by an Ad Hoc Group of Cryptographers and Computer Scientists." Jan. 1996, p. 7.*
Azgomi, Sherri; "Using Content-Addressable Memory for Networking Applications," Nov. 1999, Communications Design, an EE Times Community; vol. 5, No. 11, pp. 1 and 2.*

(Continued)

*Primary Examiner*—Benjamin C Lee
*Assistant Examiner*—Cal Eustaquio
(74) *Attorney, Agent, or Firm*—Foley & Lardner LLP

(57) ABSTRACT

An IC tag according to an embodiment of the invention includes: a storage circuit having a plurality of memory cells; and a memory control circuit receiving commands by use of a radio signal to control the storage circuit based on the commands, the commands including a specific command to collectively control the plurality of memory cells, and the memory control circuit executing control corresponding to the specific command on the storage circuit based on the specific command and first key data received in association with the specific command.

14 Claims, 6 Drawing Sheets

OTHER PUBLICATIONS

Blaze, "Minimal Key Lengths for Symmetric Ciphers to Provide Adequate Commericial Security, A Report by an Ad Hoc Group of Cryptographers and Computer Scientists." Jan. 1996, pp. 6 and 7.*

U. Karthaus, "Fully Integrated Passive UHF RFID Transponder IC With 16.7-μW Minimum RF Input Power," IEEE Journal of Solid-State Circuits, vol. 38:10, Oct. 2003, pp. 1602-1608.

* cited by examiner

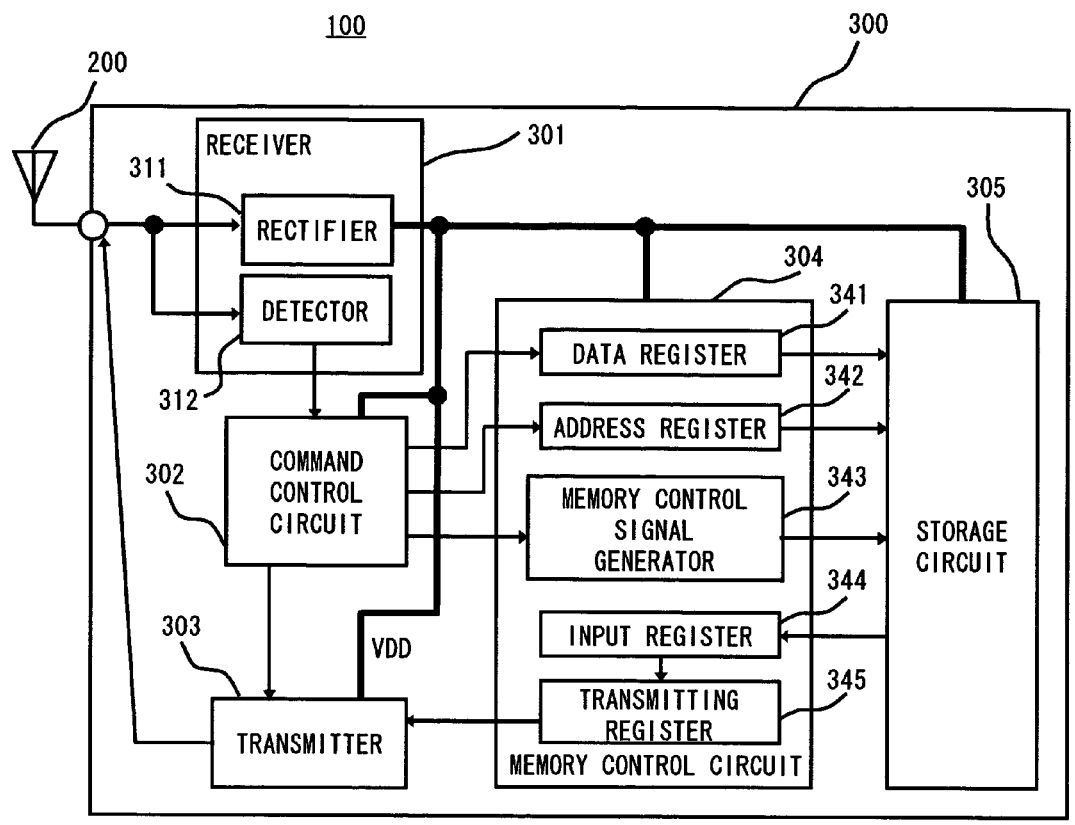
RELATED ART
Fig. 6
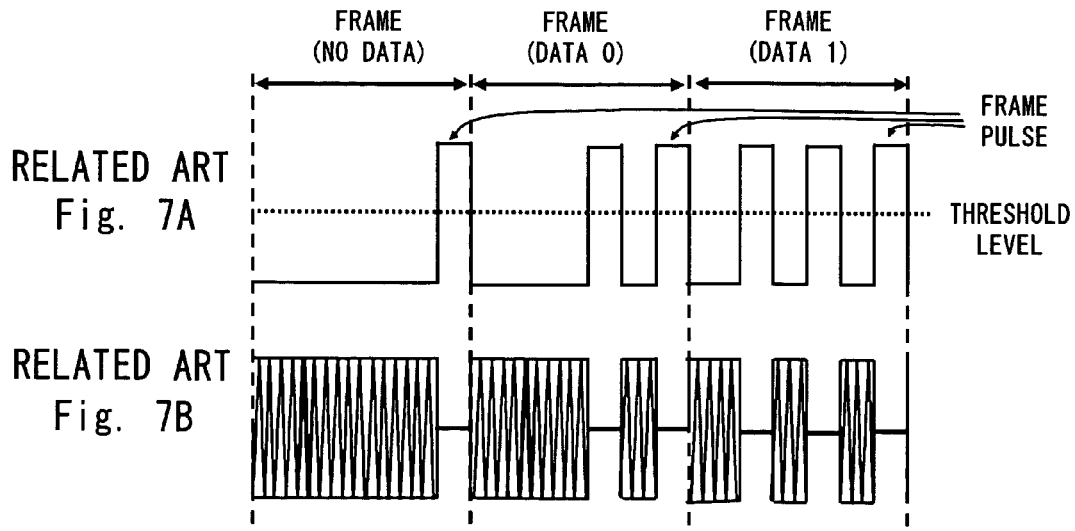
RELATED ART
Fig. 7A
RELATED ART
Fig. 7B

IC TAG, IC TAG SYSTEM, AND METHOD OF EXECUTING COMMAND OF THE IC TAG

BACKGROUND OF THE INVENTION

1. Field of the Invention

The present invention relates to an IC tag, an IC tag system, and a method of executing a command of the IC tag. In particular, the invention relates to an IC tag and an IC tag system that execute a specific command with key data and the specific command, and to a method of executing a command of the IC tag.

2. Description of Related Art

In recent years, attentions have been paid to a technique regarding RFID (Radio Frequency IDentification) in the field of physical distribution management in a factory or retail shop. This technique aims at attaching a tag including an IC storing specific information on a product to the product and scanning the information with a wireless antenna.

This technique uses a reader/writer and an RFID tag (hereinafter referred to as IC tag). The reader/writer sends a command with a modulated radio signal including data and a carrier to an IC tag, and receives a radio signal from the IC tag. The IC tag demodulates the received radio signal to execute processing in accordance with the received command. If requested to send response data with respect to the received command, the IC tag sends the response data to a reader/writer. In this example, the IC tag is prepared by integrating an IC chip and an antenna. The command is a signal transmitted with a low-frequency signal superimposed on a carrier of a radio signal.

Among the IC tags, a so-called passive type IC tag receives a radio signal from a reader/writer, and a rectifier in the IC tag generates a power supply voltage using a high-frequency carrier of the radio signal (for example, signal having a frequency of 2.45 GHz). That is, in the passive type IC tag, the radio signal for data communication with the reader/writer is utilized for power supply and data transmission/reception.

A technique of generating a power supply voltage in the circuit to drive the circuit with a received radio signal as described above is reported by Udo Kartbaus et al. in "Fully Integrated Passive UHF RFID Transponder IC With 16.7-μW Minimum RF Input Power", IEEE JOURNAL OF SOLID-STATE CIRCUITS, VOL. 38, NO. 10, October 2003, p. 1602-1608. FIG. 6 is a block diagram of a conventional IC tag 100 based on this technique.

The IC tag 100 of FIG. 6 receives a radio signal through an antenna 200. A rectifier 311 of an IC chip 300 generates a power supply voltage based on a carrier of the received radio signal. The generated power supply voltage is utilized as a power supply voltage for driving each block of the IC chip 300.

Further, a detector 312 of the IC chip 300 generates a pulse signal based on the received radio signal. A command control circuit 302 generates a command based on the generated pulse signal to control a transmitter 303 or a memory control circuit 304, or to transmit write data and a write address. In response to the signal from the command control circuit 302, the memory control circuit 304 controls an operation of writing/reading data to/from a storage circuit 305. In this example, the data writing operation is to write the write data sent from the command control circuit 302 into a memory cell of the storage circuit 305 corresponding to address data. In addition, the data reading operation is to read the read data stored in a memory cell of the storage circuit 305 corresponding to address data from the command control circuit 302 and input the read data into an input register 305 of the memory control circuit 304. The read data input to the input register 305 is transferred to a transmitting register 345 under the control of the command control circuit 302 and then sent to a reader/writer (not shown) through the transmitter 303 and the antenna 200.

Here, description is given of a radio signal transmitted/received between the reader/writer and the IC tag 100. FIG. 7A shows a pulse signal generated from a radio signal with a detector 312, and FIG. 7B shows the radio signal of FIG. 7A. As shown in FIG. 7A, the pulse signal represents "no data", "data 0", and "data 1" in accordance with the number of pulses in a frame of a predetermined period (unit time) from a falling edge of one frame pulse to a falling edge of the next frame pulse; the frame pulses are transmitted at regular intervals. The "no data" indicates a period in which only a frame pulse is transmitted, and the IC tag generates a clock signal used in an inner circuit thereof based on the frame pulse. The "data 0" corresponds a data signal of "0" and is expressed as a frame pulse and one pulse. The "data 1" corresponds to a digital signal of "1", and is expressed as a frame pulse and two pulses. The frame pulse and the pulse are recognized as a pulse by the command control circuit 302 if its level is equal to or higher than a predetermined threshold level, and a pulse the level of which is lower than the threshold level is not recognized as a pulse by the command control circuit 302.

The frame pulse or signal representing "data 0" or "data 1" is sent from the reader/writer to the IC tag by way of a carrier as shown in FIG. 7B. As shown in FIG. 7B, the carrier is a signal of a predetermined amplitude of, for example, 2.45 GHz, and during a period where the carrier transmission is stopped, the above frame pulse or pulse representing data appears. Such a signal modulating system is called "ASK (Amplitude Shift Keying) modulation".

The rectifier 311 of the IC tag 300 generates a power supply voltage from the carrier. Further, the detector 312 detects a smaller-amplitude portion of the carrier to generate a pulse. At this time, an amplitude of the pulse generated with the detector 312 is determined based on a level of the power supply voltage generated with the rectifier 311.

However, in certain use environments of the IC tag 100, a disturbance occurs in a radio signal due to influences of, for example, absorption of ambient moisture to the IC tag 100, a reflection from metal around the IC tag 100, and an interference of the antennal of the IC tag.

If the disturbance occurs in the radio signal, for example, a voltage generator cannot generate enough power supply voltage, resulting in a problem in that a detector erroneously operates to generate a wrong signal, not a pulse signal generated from a received radio signal or a problem in that the radio signal from the reader/writer is changed due to a noise, and the detector generates a wrong pulse signal, not a pulse signal to be sent from the reader/writer.

An example of the problems resulting from the generation of the wrong pulse signal is given below. In this case, if the read command is defined as "1011", and an erase all command for information in the storage circuit 305 is defined as "1010", for example, the above data recognition error occurs in the last bit of the read command, the read command is changed from "1011" to "1010" and becomes identical to the erase all command. As a result, there arises a problem in that all information in the storage circuit 305 is deleted although data is read from the storage circuit 305 under normal circumstances.

SUMMARY OF THE INVENTION

An IC tag according to an aspect of the invention includes: a storage circuit having a plurality of memory cells; and a memory control circuit receiving commands by use of a radio signal to control the storage circuit based on the commands, the commands including a specific command to collectively control the plurality of memory cells, and the memory control circuit executing control corresponding to the specific command on the storage circuit based on the specific command and first key data received in association with the specific command.

According to the IC tag of the present invention, when a specific command is executed, it is determined whether or not to execute the specific command, based on the specific command and the first key data. Thus, when the IC tag receives commands other than the specific command, if data is changed due to surrounding environments and the received command is changed to a specific command, there is no fear that the specific command is executed. That is, even if a command is received and changed under such a condition that a power supply voltage generated in the IC tag is insufficient, it is possible to prevent such a situation that the specific command is executed by mistake. Accordingly, the IC tag of present invention can prevent data stored in the storage circuit of the IC tag from being damaged due to a batch-control operation of the specific command.

BRIEF DESCRIPTION OF THE DRAWINGS

The above and other objects, advantages and features of the present invention will be more apparent from the following description taken in conjunction with the accompanying drawings, in which:

FIG. 6 is a block diagram of a conventional IC tag;

FIG. 7A shows a pulse signal waveform of a signal for data communication in an IC tag; and FIG. 7B shows a radio signal waveform of a signal for data communication in an IC tag.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

Hereinafter, embodiments of the present invention are described with reference to the accompanying drawings. An IC tag 1 according to a first embodiment of the present invention is used in an IC tag system that transmits/receives a command to/from a reader/writer by use of a radio signal. The IC tag 1 of the first embodiment executes operations of writing/reading/deleting information to/from/in the IC tag 1 based on a command from the reader/writer and address data. As regards a specific command such as an erase all command that does not require address data, the IC tag 1 determines whether or not to execute the command based on key data authenticating the command.

Figure 1:
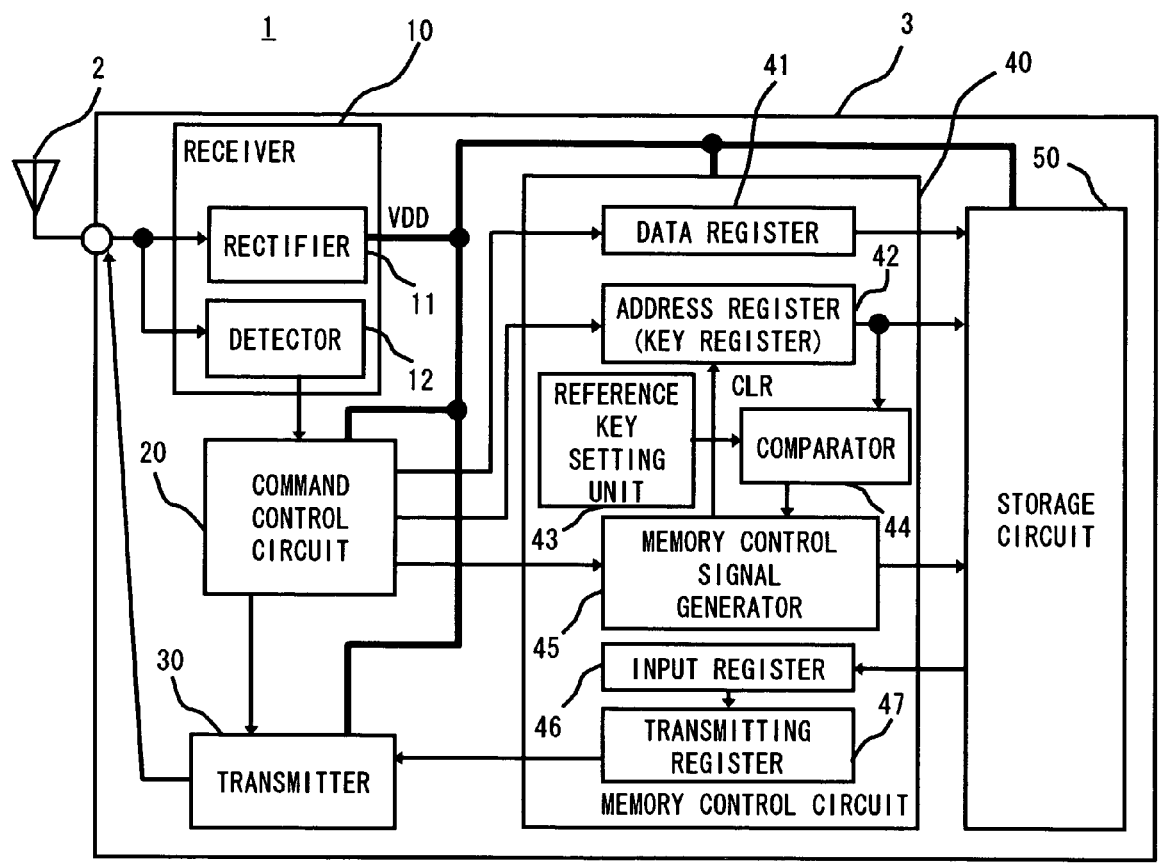
FIG. 1 is a block diagram of an IC tag according to a first embodiment of the present invention.

FIG. 1 shows the IC tag 1 of the first embodiment. As shown in FIG. 1, the IC tag 1 includes an antenna 2 and a semiconductor device (IC chip) 3. The reader/writer (not shown) transmits/receives a radio signal to/from the IC tag 1 through the antenna 2. The IC chip 3 is completed by integrating circuits on a semiconductor substrate, and incorporates various functions of the IC tag 1.

The IC chip 3 includes a receiver 10, a command control circuit 20, a transmitter 30, a memory control circuit 40, and a storage circuit 50. The receiver 10 includes a rectifier 11 and a detector 12. The rectifier 11 includes, for example, a diode and a capacitor, and generates a power supply voltage VDD from a carrier component (for example, 2.45 GHz) of a radio signal received through the antenna 2. The detector 12 detects a lower-frequency signal component in the ASK-modulated radio signal to generate a pulse signal as a command.

The command control circuit 20 controls a transmitter 30 or a memory control circuit 40 based on a command from the detector 12. The transmitter 30 sends a data signal received from the memory control circuit 40 to the reader/writer through the antenna 2 in response to an instruction from the command control circuit 20.

The memory control circuit 40 includes a first storage circuit (for example, a data register 41 and an address register 42), a second storage circuit (for example, a reference key setting unit) 43, a comparator 44, a memory control signal generator 45, an input register 46, and a transmitting register 47.

The data register 41 is a memory for temporarily storing data, and is a circuit holding write data to be stored in a storage circuit 50. The address register 42 is a memory for temporarily storing data, and holds a address data or a first key data (for example, key data). The address data is a address of a memory cell of the storage circuit 50 to be controlled. The key data authenticates a command. A reference key setting unit 43 is a memory for continuously storing data, for example, and is a block storing second key data (for example, reference key data) set at the time of setting the IC tag 1 or after activating the IC tag 1. Here, the reference key data can be changed with a reference data change command from the reader/writer, for example.

A comparator 44 compares the key data with the reference key data. If the key data matches the reference key data, the comparator circuit 44 sends a signal to enable execution of a command, toward a memory control signal generator 45. The memory control signal generator 45 outputs a signal for controlling a memory regardless of an enabling signal unless a command sent from the command control circuit 20 is the erase all command. The input register 46 is a circuit storing information read from the storage circuit 50 to output the information to the transmitting register 47 when the read command is executed. The transmitting register 47 is a circuit outputting the information in the input register 46 to a transmitter 30.

The memory control circuit 40 executes operations of writing/reading/erasing/completely erasing information to/from/in/in the storage circuit 50 in accordance with a command from the command control circuit 20. The operations of the memory control circuit 40 are described in detail below.

The storage circuit 50 is a nonvolatile memory capable of rewriting information, such as a flash memory. The storage circuit 50 stores ID as identification information of the IC tag and user data that can be rewritten when the tag is used. The storage circuit 50 is described in more detail below.

Figure 2:
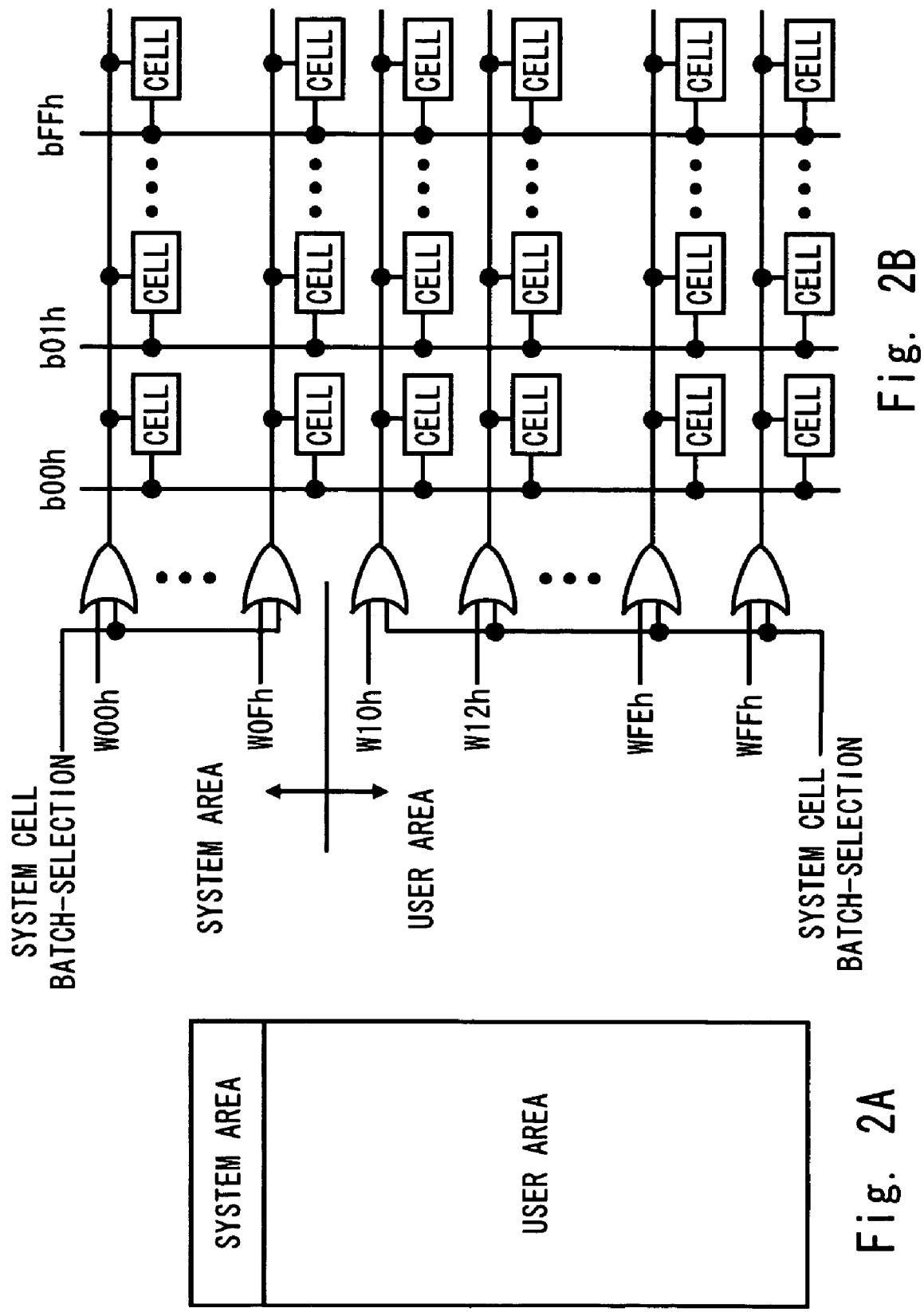
FIG. 2A is a block diagram of a storage area of the first embodiment.
FIG. 2B is a circuit diagram of the storage area of the first embodiment.

FIG. 2A shows defined areas in the storage circuit 50. As shown in FIG. 2A, the storage circuit 50 includes a system area and a user area. In the system area, information is written at the time of setting the IC tag 1. In the case where a general user uses the area, information cannot be rewritten to the system area. The system area stores, for example, system information such as ID. As regards the user area, information can be rewritten to/read from/erased from the area when a general user uses the area. The user area stores, for example, commodity management history information.

FIG. 2B is a circuit diagram of an example of the storage circuit 50. As shown in FIG. 2B, the storage circuit 50 has memory cells arranged in matrix as information storage portions, and includes bit lines b00h to bFFh for selecting row-directional memory cells and word lines W00h to WFFh for selecting column-directional memory cells. The storage circuit 50 drives the bit lines and word lines one by one in accordance with address data from the memory control circuit 40 to thereby select one memory cell, and executes an operation instructed by the memory control circuit 40 on the memory cell.

Further, the word lines W00h to WFFh are connected with a corresponding one of the memory cells through an OR circuit. The OR circuit has two input terminals. One terminal thereof is connected with a corresponding word line. The other terminal of the OR circuit connected with the word lines W00h to W0Fh is applied with a system cell batch-selection signal. The other terminal of the OR circuit connected with the word lines W10h to WFFh is applied with a user cell batch-selection signal. That is, a memory cell area controlled by the OR circuit applied with the system cell batch-selection signal is the system area, and a memory cell area controlled by the OR circuit applied with the user cell batch-selection signal is the user area. The system cell batch-selection signal and the user cell batch-selection signal enable the selection of all memory cells controlled with the OR circuit applied with the selection signal to batch-control the selected memory cells when at High level (for example, power supply potential). On the other hand, if the selection signals are at Low level (for example, ground potential), memory cells are controlled in accordance with word lines driven on the basis of address data.

Incidentally, the configuration of the storage circuit 50 is not limited to the above and can be changed as appropriate. For example, the numbers of word lines and bit lines can be changed as appropriate. Further, the areas to be batch-controlled are not limited to the system area and the user area. For example, the user area may be further divided into sub-areas, and batch control may be carried out on a sub-area basis.

The operations of the IC tag 1 of the first embodiment are described in detail below. The operations are individually described as for the write operation, the read operation, the erase operation, and the erase all operation. Incidentally, the following command transmission order and execution order are given by way of example, and can be changed as appropriate.

In this example, the write operation, the read operation, and the erase operation are carried out in accordance with a write command, a read command, and an erase command, respectively. Further, the respective operations are carried out on a memory cell designated by address data that specifies one of the plural memory cells of the storage circuit 50. The erase all operation is carried out in accordance with an erase all command, and executed on a memory cell in the above batch-controllable area. Accordingly, the erase all command can be executed without address data. Such commands to collectively execute an operation on the plural memory cells of the storage circuit 5 without designating a memory cell with the address data are referred to as "specific commands".

The write operation is described hereinbelow. The reader/writer sends write data to the IC tag 1. The detector 12 generates a pulse signal from a received radio signal. The command control circuit 20 generates write data based on the generated pulse signal. The generated write data is stored in the data register 41 by the command control circuit 20.

Next, the reader/writer sends address data to the IC tag 1. The detector 12 generates a pulse signal based on a received radio signal, and the command control circuit 20 generates address data based on the pulse signal. The generated address data is stored in the address register 42 by the command control circuit 20.

Subsequently, the reader/writer sends a write command to the IC tag 1. The detector 12 generates a pulse signal based on a received radio signal, and the command control circuit 20 generates a write command based on the pulse signal. The generated write command is sent to the memory control signal generator 45 by the command control circuit 20. In this example, the write command does not need to be authenticated with the key data, so the memory control signal generator 45 sends a write control signal to the storage circuit 50. Hence, the write data stored in the data register 41 is written to a memory cell of the storage circuit 50 corresponding to the address data stored in the address register 42.

The read operation is described hereinbelow. The reader/writer sends the address data to the IC tag 1. The detector 12 generates a pulse signal from a received signal based on the radio signal, and the command control circuit 20 generates address data based on the pulse signal. The generated address data is stored in the address register 42 by the command control circuit 20.

Subsequently, the reader/writer sends a read command to the IC tag 1. The detector 12 generates a pulse signal from a received signal based on the radio signal, and the command control circuit 20 generates a command based on the pulse signal. The generated command is sent to the memory control signal generator 45 by the command control circuit 20. Here, the read command does not need to be authenticated with the key data, so the memory control signal generator 45 sends a read control signal to the storage circuit 50. Thus, information stored in a memory cell of the storage circuit 50 corresponding to the address data stored in the address register 42 is input to the input register 46. The read information is sent to the reader/writer through the transmitting register 47 and the transmitter 30.

The erase operation is described hereinbelow. The reader/writer sends address data to the IC tag 1. The detector 12 generates a pulse signal from a received signal based on the radio signal, and the command control circuit 20 generates address data based on the pulse signal. The generated address data is stored in the address register 42 by the command control circuit 20.

Next, the reader/writer sends an erase command to the IC tag 1. The detector 12 generates a pulse signal from a received signal based on the radio signal, and the command control circuit 20 generates an erase command based on the pulse signal. The generated erase command is sent to the memory control signal generator 45 by the command control circuit 20. Here, the erase command does not need to be authenticated with the key data, so the memory control signal generator 45 sends a read control signal to the storage circuit 50. Thus, information stored in a memory cell of the storage circuit 50 corresponding to the address data stored in the address register is deleted.

The erase all operation is described hereinbelow. The erase all operation controls memory cells of the storage circuit 50 in a batch-controllable range, so it is unnecessary to use address data designating a memory cell. Thus, the address data is not sent from the reader/writer. Instead of sending the address data, key data for authenticating the erase all command is sent.

The reader/writer sends key data to the IC tag 1. The detector 12 generates a pulse signal from a received signal based on the radio signal, and the command control circuit 20 generates key data based on the pulse signal. The generated key data is stored in the address register 42 by the command control circuit 20.

Subsequently, the reader/writer sends an erase all command to the IC tag 1. The detector 12 generates a pulse signal from a received signal based on the radio signal, and the command control circuit 20 generates an erase all command based on the pulse signal. The generated erase all command is sent to the memory control signal generator 45 by the command control circuit 20. Here, the erase all command needs to be authenticated with the key data. The command is authenticated with a key by the comparator 44 comparing key data stored in the address register 42 with reference key data stored in the reference key setting unit 43. If the comparator 44 determines that the key data matches the reference key data, the comparator 44 sends an enabling signal to the memory control signal generator 45. The memory control signal generator 45 sends an erase all control signal to the storage circuit 50 in accordance with the enabling signal. Thus, information in memory cells of a batch-controllable user area out of the memory cells of the storage circuit 50 is all deleted. After that, the memory control signal generator 45 erases the key data stored in the address register 42 by use of a CLR signal.

As described above, according to the IC tag 1 of this embodiment, key data for authenticating the erase all command is sent, and when the key data matches the reference key data, the erase all command can be executed. Thus, even if an amplitude of a carrier is small and the power supply voltage does not increase up to a sufficient level, for example, with the result that the data 1 is changed to the data 0, and a command that is not an erase all command under ordinary circumstances becomes the erase all command, the erase all command is not executed unless the key data authenticates the erase all command. Accordingly, if a wrong command is received, information stored in the storage circuit 50 can be protected.

Further, in this embodiment, an existing address register is used as a storage circuit of key data, so there is no need to prepare another register for the key data. Accordingly, the design change is less made than a conventional circuit, and a designing period can be shortening. Further, the number of additional circuits can be reduced as compared with the conventional circuit, so an increase in chip area can be suppressed.

Moreover, according to the IC tag 1 of the first embodiment, even when data is changed halfway through a communication path due to an interference of an antenna at the time of receiving a command, a command is executed through the authentication with the key data. Hence, in the IC tag 1 of the first embodiment, there is no fear that a command is erroneously executed even in the above case.

Incidentally, the control of whether or not to execute a command based on the key data is applicable to not only the erase all command but also other commands.

Second Embodiment

Figure 3:
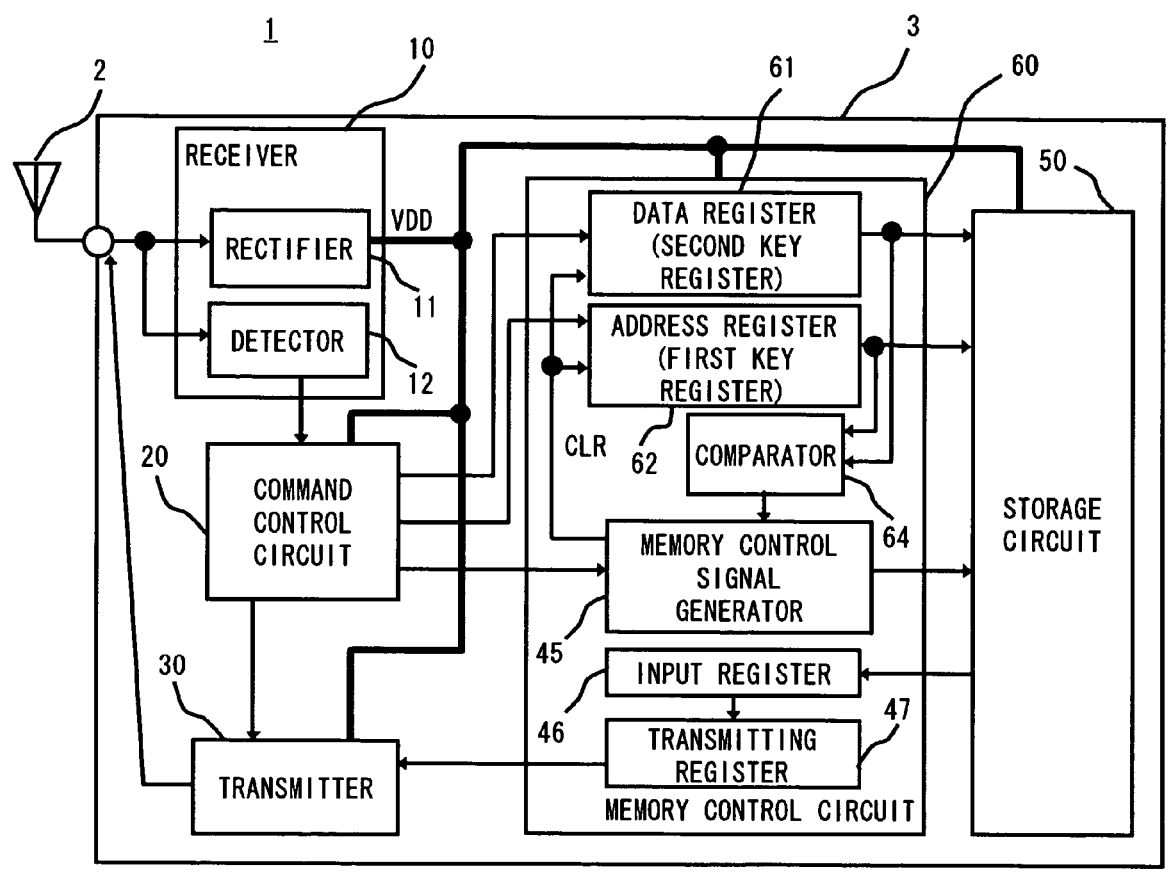
FIG. 3 is a block diagram of an IC tag according to a second embodiment of the present invention.
Figure 4:
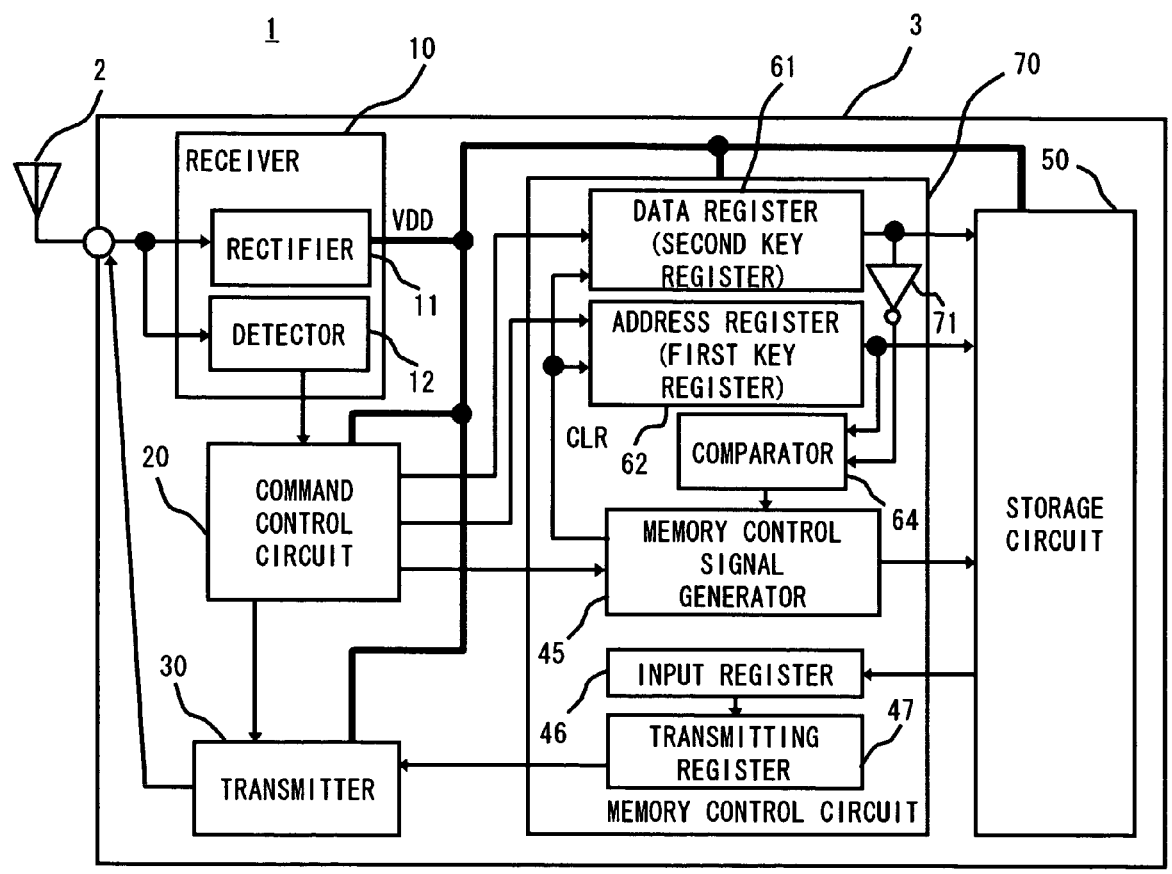
FIG. 4 is a block diagram of an IC tag according to a third embodiment of the present invention.
Figure 5:
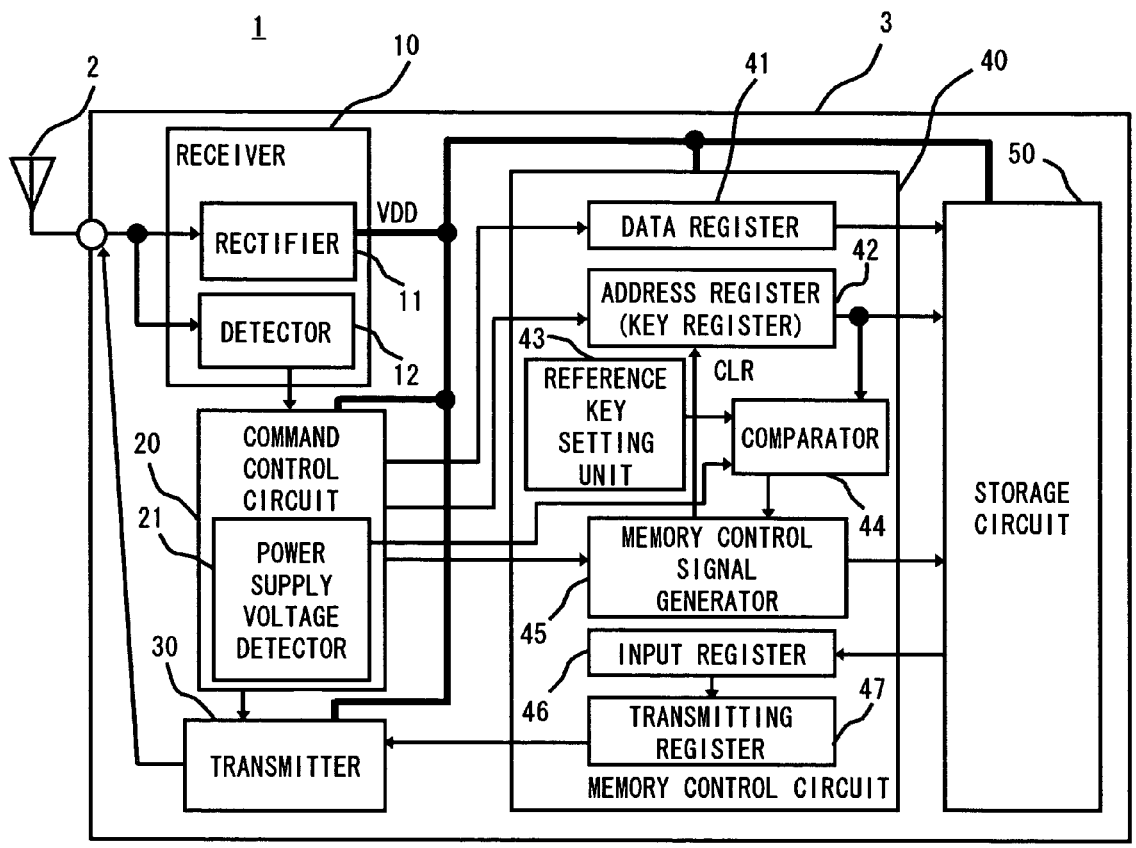
FIG. 5 is a block diagram of an IC tag according to a fourth embodiment of the present invention.

An IC tag according to a second embodiment of the present invention differs from the IC tag of the first embodiment in that a data register is used as a storage circuit of the reference key data although the reference key data is stored in the reference key setting unit in the first embodiment. That is, the operation of comparing two key data and executing an erase all command based on the comparison result is substantially the same between the first embodiment and the second embodiment. FIG. 3 shows the IC tag according to the second embodiment of the present invention. In this example, blocks operating in the same way as the first embodiment are denoted by like reference numerals, and description thereof is omitted here.

The IC tag according to the second embodiment of the present invention is described in detail. A memory control circuit 60 of the IC chip of the second embodiment includes a first storage circuit (for example, address register) 62 and a second storage circuit (for example, data register) 61. The address register 62 is a memory for temporarily storing data, and stores address data for designating a memory cell of the storage circuit 50, or first key data. Further, the data register 61 is a memory for temporarily storing data, and stores data to be written to the memory cell of the storage circuit 50, or second key data.

The write operation, the read operation, and the erase operation of the IC tag of the second embodiment are the same as those of the IC tag of the first embodiment, so description thereof is omitted. An erase all operation of the IC tag of the second embodiment is described hereinbelow.

In the erase all operation, the operation for the memory cell of the storage circuit 50 is the same as that of the first embodiment. First, the reader/writer sends the first key data to the IC tag 1. The first key data is stored in the address register 62 through the detector 12 and the command control circuit 20. Next, the reader/writer sends the second key data to the IC tag 1. The second key data is stored in the data register 61 through the detector 12, and the command control circuit 20.

Subsequently, the reader/writer sends an erase all command to the IC tag 1. The erase all command is sent to the memory control signal generator 45 through the detector 12, and the command control circuit 20. Here, the erase all command needs to be authenticated with key data. The command is authenticated with a key by a comparator 64 comparing the first key data stored in the address register 62 with the second key data stored in the data register 61. If the comparator 64 determines that the first key data matches the second key data, the comparator 64 sends an enabling signal to the memory control signal generator 45. The memory control signal generator 45 sends an erase all control signal to the storage circuit 50 based on the enabling signal. Hence, information in memory cells in a batch-controllable user area among the memory cells of the storage circuit 50 is completely erased. After that, the memory control signal generator 45 erases the key data stored in the address register 62 and the data register 61 by use of a CLR signal.

As described above, in the IC tag of the second embodiment, two key data to be compared are stored in the existing data register 61 and address register 62. Hence, it is possible to dispense with the reference key setting unit necessary in the first embodiment. The IC tag of the second embodiment enables a smaller circuit size than that of the first embodiment. Further, even if a function of authenticating a command with key data is added, design change is less made than the conventional circuit, and a designing period can be shortened.

Third Embodiment

FIG. 3 is a block diagram of an IC tag according to a third embodiment of the present invention. Referring to FIG. 3, the IC tag of the third embodiment is described. The IC tag of the third embodiment differs from the IC tag of the second embodiment in terms of the formats of the first and second key data. Accordingly, a command processing of the IC tag is substantially the same between the second embodiment and the third embodiment.

A bit string of the first and second key data used in the IC tag of the third embodiment is data of 7 or more bits if the address data designating a memory cell of the storage circuit 50 and the write data are 6-bit data, for example. That is, the bit length of the first and second key data is longer than the bit length of the address data and write data, so the first and second key data are never misidentified as the address data and the write data.

Further, the IC tag of the third embodiment uses data obtained by inverting a logic type of the first key data, as data corresponding to the second key data of the second embodiment. Thus, as shown in FIG. 3, in the IC tag of the third embodiment, an inverter 71 is inserted to the wiring extending from the data register 61 to the comparator 64. As a result, when the first key data and the second key data are inverted with respect to each other, the comparator 64 can execute comparison with the inverted data of the first key data and the second key data as the same data.

As described above, according to the IC tag of the third embodiment, data that can be used as the first and second key data and the address data is used. Thus, it is possible to prevent such a situation that the address data, the write data, and the command are changed when received, and an erase all command is executed by mistake. That is, the bit length of the first and second key data is inadaptable to that of the address data and the write data, so even if the address data and the write data are changed, the first and second key data are never changed, and thus the IC tag of the third embodiment does not erroneously execute the erase all command.

Fourth Embodiment

An IC tag according to a fourth embodiment of the present invention determines whether or not to authenticate a command with key data based on the level of a power supply voltage generated with the rectifier 11. For example, if the power supply voltage reaches a sufficient level, neither the authentication of the command with the key data nor the transmission of the key data is carried out. On the other hand, if the power supply voltage does not reach a sufficient level, the authentication of the command with the key data is carried out.

An IC tag according to a fourth embodiment of the present invention differs from the IC tag of the first embodiment in that the command control circuit 20 is provided with a power supply voltage detector 21. The power supply voltage detector 21 notifies the reader/writer, if the power supply voltage is equal to or higher than a predetermined voltage, that the IC tag generates a sufficient power supply voltage, through the transmitter 30, and also informs the comparator 44 to that effect. When receiving a notification that the IC tag generates a sufficient power supply voltage, the reader/writer does not transmit key data. Further, when a sufficient power supply voltage is generated, and a command that needs to be authenticated with key data is input to the memory control signal generator 45, the comparator 44 sends an enabling signal without comparison with the key data.

On the other hand, if a power supply voltage is lower than the predetermined voltage, for example, a power supply voltage detector 21 determines that a power supply voltage is insufficient and sends no notification to the reader/writer and the comparator 44 through the transmitter 30. If not receiving a notification that the IC tag generates a sufficient power supply voltage, the reader/writer transmits key data. Further, if a sufficient power supply voltage is not generated, and a command that needs to be authenticated with key data is input to the memory control signal generator 45, the comparator 44 executes comparison with the key data to send an enabling signal based on the authentication result.

As described above, the IC tag of the fourth embodiment determines whether or not to execute authentication with key data depending on the level of the power supply voltage generated with the rectifier 11. If a sufficient power supply voltage is generated, there is little fear that data is changed upon receiving a command. That is, if the power supply voltage is insufficient, and it is highly possible that the data is changed, the authentication with the key data is executed. Thus, if the sufficient power supply voltage is generated, a key data transmitting period and a period necessary for authentication with the key data can be reduced.

The present invention authenticates a command with key data at the time of executing the command, and determines whether or not to execute the command based on the authentication result. Accordingly, although the radio signal used in communications is defined as the data 1 and the data 0 in accordance with the number of pulses in the above embodiment, the present invention is not limited thereto. The radio signal may be defined as the data 1 and the data 0 in accordance with the pulse width. Furthermore, the command transmission order may be changed as appropriate.

It is apparent that the present invention is not limited to the above embodiment that may be modified and changed without departing from the scope and spirit of the invention.

What is claimed is:

1. An IC tag, comprising:
   a first storage circuit including a plurality of addressable memory cells;
   a memory control circuit receiving a command and an address by use of a radio signal to control the first storage circuit based on the command and the address;
   an address storage circuit storing the received address;
   a second storage circuit containing relations of specific commands not requiring address data of memory cells to respective reference keys; and
   a comparator circuit coupled to the address storage circuit and the second storage circuit, the comparator circuit comparing a received authorization key included in the received address with the reference keys, wherein when the received command is a command requiring address data, the memory control circuit performs a memory control in response to the received command and the address stored in the address storage circuit, wherein when the received command is a specific command not requiring address data, the comparator circuit compares the respective reference key related to the received specific command with the received authentication key included in the address received with the specific command stored in the address storage circuit and if the keys match the memory control circuit performs a memory control in response to the received command.

2. The IC tag according to claim 1, wherein the specific command is an erase all command to collectively erase information in the plurality of memory cells.

3. The IC tag according to claim 1, wherein the specific command is a write all command to collectively write information to the plurality of memory cells.

4. The IC tag according to claim 1, wherein the first storage circuit includes a user area that can be rewritten by a user, the user area includes at least one batch-controllable area, and the specific command is executed by collectively controlling the plurality of memory cells in the batch-controllable area.

5. The IC tag according to claim 1, wherein the memory control circuit executes the specific command when a value of a power supply voltage generated based on a radio signal is a predetermined voltage or higher.

6. The IC tag according to claim 1, wherein a logic type of the authentication key data and a logic type of the reference key data are inverted with respect to each other.

7. The IC tag according to claim 1, wherein a bit length of the address including the authentication key is longer than a bit length of the address used with a received command requiring address data.

8. The IC tag according to claim 1, wherein the authentication key data is stored in a third storage circuit storing address data for selecting one of the plurality of memory cells or in a fourth storage circuit storing write data to be written to the memory cell.

9. The IC tag according to claim 1, wherein the second storage circuit also stores address data for selecting one of the plurality of memory cells.

10. An IC tag system, comprising:
   a reader/writer transmitting command data and address data by use of a radio signal; and
   an IC tag receiving the radio signal sent from the reader/writer,
   the IC tag comprising:
      a first storage circuit including a plurality of addressable memory cells storing data;
      a memory control circuit receiving a command and an address based on the command data and address data to control the first storage circuit,
      an address storage circuit storing the received address;
      a second storage circuit containing relations of specific commands not requiring address data of memory cells to respective reference keys; and
      a comparator circuit coupled to the address storage circuit and the second storage circuit, the comparator circuit comparing a received authorization key included in the received address with the reference keys,
   wherein when the reader/writer transmits a specific command not requiring address data, the reader/writer transmits the authentication key as the address data, wherein when the received command is a command requiring address, the memory control circuit performs a memory control in response to the received command and the address stored in the address storage circuit,
   wherein when the received command is a specific command not requiring address data, the comparator circuit compares the reference key related to the received specific command with the received authentication key included in the address received with the specific command stored in the address storage circuit and if the keys match the memory control circuit performs a memory control in response to the received command.

11. The IC tag according to claim 1, wherein a bit length of the received authentication key included in the address received with the specific command is one bit different than a bit length of the address included with the command and an address requiring address data of memory cells.

12. The IC tag according to claim 1, wherein the comparator circuit obtains the specific command from the second storage circuit.

13. The IC tag system according to claim 10, wherein a bit length of the received authentication key included in the address received with the specific command is one bit different than a bit length of the address included with the command and an address requiring address data of memory cells.

14. The IC tag system according to claim 10, wherein the comparator circuit obtains the specific command from the second storage circuit.

* * * * *